United States Patent
Bedner et al.

(10) Patent No.: US 6,681,167 B2
(45) Date of Patent: Jan. 20, 2004

(54) VEHICLE CHASSIS CONTROL WITH COORDINATED BRAKE AND STEERING CONTROL ON SPLIT COEFFICIENT SURFACE

(75) Inventors: Edward John Bedner, Brighton, MI (US); Aleksander Boguslaw Hac, Dayton, OH (US); Hsien Heng Chen, Troy, MI (US); Ashok Chandy, Fenton, MI (US); Michael John Check, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 36 days.

(21) Appl. No.: 10/164,321

(22) Filed: Jun. 4, 2002

(65) Prior Publication Data

US 2002/0198646 A1 Dec. 26, 2002

Related U.S. Application Data

(63) Continuation-in-part of application No. 09/921,634, filed on Aug. 3, 2001, which is a continuation-in-part of application No. 09/825,024, filed on Dec. 15, 2000, now abandoned.
(60) Provisional application No. 60/295,648, filed on Jun. 4, 2001, and provisional application No. 60/170,990, filed on Dec. 15, 1999.

(51) Int. Cl.[7] .............................. G06F 17/00; B60T 8/60
(52) U.S. Cl. .............................. 701/48; 701/37; 701/41; 701/80; 303/140; 180/197
(58) Field of Search .............................. 701/48, 37, 41, 701/70, 73, 78, 80, 83, 91; 303/140, 146; 180/197

(56) References Cited

U.S. PATENT DOCUMENTS

| | | | |
|---|---|---|---|
| 5,063,514 A | 11/1991 | Headley et al. | 364/426.02 |
| 5,316,379 A | 5/1994 | Becker et al. | 303/100 |
| 6,035,251 A | 3/2000 | Hac et al. | 701/70 |
| 6,125,319 A | 9/2000 | Hac et al. | 701/80 |
| 6,131,688 A | 10/2000 | Fukada | 180/408 |
| 6,161,905 A | 12/2000 | Hac et al. | 303/146 |
| 6,195,606 B1 | 2/2001 | Barta et al. | 701/70 |
| 6,349,789 B1 | 2/2002 | Nakano et al. | 180/446 |

*Primary Examiner*—Tan Q. Nguyen
(74) *Attorney, Agent, or Firm*—Robert M. Sigler

(57) ABSTRACT

A vehicle chassis control stores first and second calibrated values of a predetermined braking parameter and a steering correction parameter. The control includes apparatus for detecting a split coefficient condition with respect to the road surface; and, when it does and a braking signal is present, the control actuates braking apparatus for a wheel on the side of the vehicle having the higher coefficient of friction with the first calibrated value of the predetermined braking parameter and simultaneously actuates the steering apparatus with a steering correction to compensate for yaw induced by braking on the split coefficient road surface. If the steering correction is not available, however, the braking apparatus is actuated for the wheel having the higher coefficient of friction with the second calibrated value of the predetermined braking parameter without simultaneously actuating the steering apparatus with the steering correction. The steering correction may have an open loop part derived from a difference between wheel slips of two wheels on opposite sides of the vehicle and/or a closed loop part derived from yaw rate, side slip and/or side slip rate error.

12 Claims, 3 Drawing Sheets

STEER DIRECTION DETERMINATION

| SYSTEM | CHANGE | HI CO | STEER COMMAND |
|---|---|---|---|
| REAR STEER | DECEL | LEFT | STEER TO LEFT |
| REAR STEER | DECEL | RIGHT | STEER TO RIGHT |
| REAR STEER | ACCEL | LEFT | STEER TO RIGHT |
| REAR STEER | ACCEL | RIGHT | STEER TO LEFT |
| FRONT STEER | DECEL | LEFT | STEER TO RIGHT |
| FRONT STEER | DECEL | RIGHT | STEER TO LEFT |
| FRONT STEER | ACCEL | LEFT | STEER TO LEFT |
| FRONT STEER | ACCEL | RIGHT | STEER TO RIGHT |

FIG. 3

VEHICLE CHASSIS CONTROL WITH COORDINATED BRAKE AND STEERING CONTROL ON SPLIT COEFFICIENT SURFACE

RELATED APPLICATIONS

Reference is hereby made to U.S. Provisional Application No. 60/295,648, filed Jun. 4, 2001. In addition, this application is a Continuation-in-Part of U.S. Ser. No. 09/921,634, filed Aug. 3, 2001, which is a Continuation-in-Part of U.S. Ser. No. 09/825,024, filed Dec. 15, 2000 now abandoned and referenced U.S. Provisional Application No. 60/170,990, filed Dec. 15, 1999, all of which applications are assigned to the assignee of this application and are incorporated by reference herein.

TECHNICAL FIELD

The technical field of this application is vehicle chassis control with coordinated brake and steering control.

BACKGROUND OF THE INVENTION

Braking or acceleration of a vehicle on a split coefficient surface, wherein one or more wheels on one side of the vehicle encounter a significantly larger coefficient of friction with the road surface than one or more on the other side of the vehicle, can produce a large difference in longitudinal forces that tend to produce an undesired yaw moment (rotation) of the vehicle. Although this tendency can be countered with a counter steering input, this is difficult even for experienced drivers, since it can happen quickly and without warning. Thus, the anti-lock braking systems (ABS) and companion traction control systems (TCS) of many vehicles are provided with means to detect a split coefficient condition and reduce the brake pressure apply rate on one or both wheels on the high coefficient side so as to slow down the effect of the yaw moment and allow the driver to recognize and provide a steering correction. But this compromise usually results in somewhat longer stopping distances in deceleration as some deceleration is given up for the increased vehicle stability.

SUMMARY OF THE INVENTION

The invention is a vehicle chassis control that reduces the need for compromise between deceleration/acceleration and stability in a split coefficient condition stores first and second calibrated values of a predetermined braking parameter. The first and second calibrated values of the predetermined braking parameter are calibrated to be used, respectively, when a steering correction is available and when it is not available. The control includes apparatus for detecting a split coefficient condition and, when it does and a braking signal is present, actuating braking apparatus for the wheel having the higher coefficient of friction with the first calibrated value of the predetermined braking parameter and simultaneously actuating the steering apparatus with a split coefficient steering correction to compensate for yaw induced by braking on the split coefficient road surface. If the split coefficient steering correction is not available, however, the braking apparatus is actuated for the wheel having the higher coefficient of friction with the second calibrated value of the predetermined braking parameter without simultaneously actuating the steering apparatus with the steering correction parameter. Thus, the system is always able to choose the best option for brake apply during a split coefficient condition by applying the steering correction with faster brake apply when possible but applying the brakes more slowly when steering correction is not possible. The split coefficient steering correction may have an open loop part derived from a difference between wheel slips of two wheels on opposite sides of the vehicle and/or a closed loop part derived from a yaw rate error, side slip or side slip rate error.

BRIEF DESCRIPTION OF THE DRAWINGS

The present invention will now be described, by way of example, with reference to the accompanying drawings, in which:

FIG. 3 is a table for determining a steering correction angle in the vehicle chassis control of FIG. 1.

DESCRIPTION OF THE PREFERRED EMBODIMENT

Figure 1:
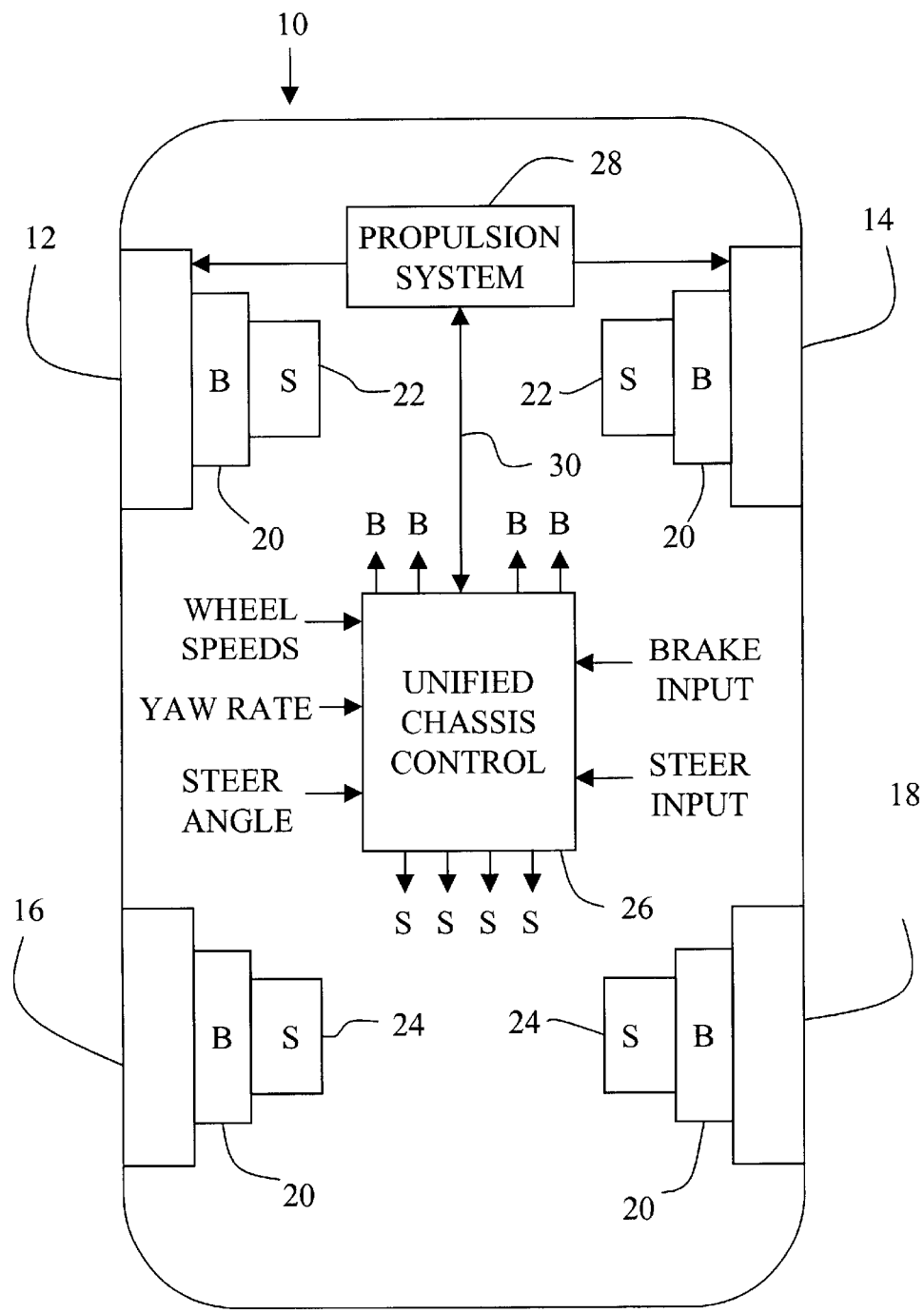
FIG. 1 is a schematic/block diagram of a vehicle having a vehicle chassis control according to the invention.

FIG. 1 shows a vehicle, in schematic/block diagram form, having a unified chassis control according to the invention. Vehicle body 10 is supported on four wheels 12, 14, 16, 18. Front left and right wheels 12, 14 respectively are axially aligned in a front axle arrangement; and rear left and right wheels 16, 18 respectively are axially aligned in a rear axle arrangement. Each of wheels 12–18 is provided with a brake (B) actuator 20, which includes anti-lock braking (ABS) apparatus and a built in wheel speed sensor but otherwise may comprise any actuator arrangement known in the art capable of braking the wheels in a manner consistent with this description. Wheels 12, 14 of the front axle are steered by front steering (S) actuators 22, which may comprise any actuator arrangement known in the art capable of steering front wheels 12, 14 in a manner consistent with this description. Wheels 16, 18 of the rear axle are steered by steer (S) actuators 24, which may comprise any actuator arrangement known in the art capable of steering rear wheels 16, 18 in a manner consistent with this description. Brake actuators 20, front steer actuators 22 and rear steer actuators 24 receive control signals from a unified chassis control 26. Unified chassis control 26 may comprise a programmed digital computer controlling both the brakes and the steering of the vehicle. Alternatively, unified chassis control 26 may comprise separate brake and steering control computers communicating with each other in a known manner, one of the computers such as the brake computer taking the lead in co-ordination of their separate controls. This description is written in terms of the single computer for simplicity. Vehicle 10 is further provided with a propulsion system 28 including a control, not separately shown, that communicates with unified chassis control 26 over a vehicle bus 30 for purposes such as communicating a vehicle speed signal, a traction control signal or other signals between unified chassis control 26 and propulsion system 28. In the shown embodiment, propulsion system 28 drives the front wheels 12, 14 of the vehicle; but it could alternatively drive the rear wheels 16, 18 or all the wheels.

Unified chassis control 26 is provided with input signals of wheel speeds of the vehicle wheels from the wheel speed sensors, driver brake command signals from the brake pedal and driver steer inputs from the handwheel. The driver steer input is typically used to determine a desired front steer angle from which a rear steer angle is determined.

Figure 2:
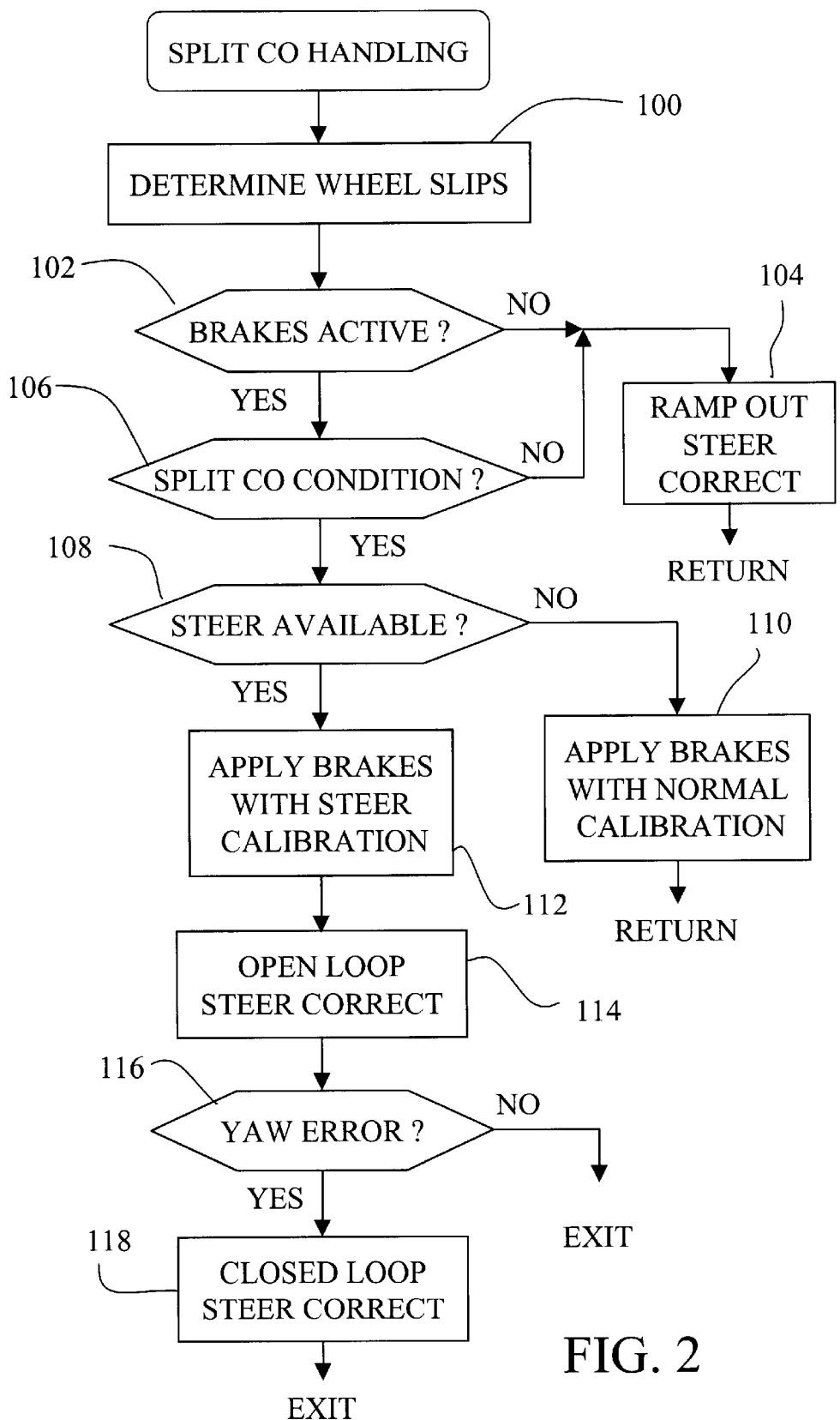
FIG. 2 is a computer flow chart illustrating the operation of the vehicle chassis control of FIG. 1.

Referring to FIG. 2, routine SPLIT CO HANDLING begins at step 100 by determining wheel slips for selected wheels of vehicle 10 from the wheel speed signals in a known manner. Next, the routine determines at step 102 if braking is active. Braking will be active while a braking command signal is present at a braking unit and the unit is capable of responding to a braking correction signal provided by the control of this invention. In a brake by wire system, where control of individual brake units is exerted by electrical signals issued by a controller, braking will be active whenever braking is commanded for a breaking unit by operator or system, including wheel braking during traction control. In a more limited control of braking, such as a hydraulically actuated braking system with supplemental anti-lock braking (ABS), traction control system (TCS) and/or vehicle stability enhancement (VSE) using brakes to control wheel slip and/or vehicle yaw rate, braking will be considered active when one of these supplemental systems or controls is active, since these systems are the only way for the chassis control of this invention to affect braking.

If braking is not active at step 102, the routine at step 104 ramps out any steering correction, as will be explained at a later point in this description, and then returns for the next loop. But if braking is active at step 102, the routine next determines at step 106 if a split coefficient condition has been detected. A split coefficient surface is defined as a condition in which a braked wheel on one side of the vehicle experiences a coefficient of friction with the road or ground surface on which it attempts to exert lateral and/or longitudinal forces that is different from a similar coefficient of friction experienced by a wheel on the other side of the vehicle. The system designer may choose whether or not the wheels on opposite sides of the vehicle must be on the same axle. A number of ways of determining a split coefficient surface are known; but an example using the wheel slips determined at step 100 is described in U.S. Pat. No. 5,063,514 to Headley et al. If no split coefficient surface is detected at step 106, the routine proceeds to step 104, previously described, and then returns for the next loop.

If a split coefficient surface is detected at step 106, the routine next determines at step 108 if a steering correction is available. Steering actuators 22 of the front wheels 12 and 14 provide the primary steering of vehicle 10; and, in this embodiment, steering actuators 24 of the rear wheels 16 and 18 provide supplemental steering in a four wheel steering system. In such a system, rear wheels 16 and 18 are steered in a known, coordinated manner with front wheels 12 and 14 in predetermined driving situations such as parking and low speed turning in response to inputs such as vehicle speed and operator demanded steer angle for the front wheels to facilitate vehicle maneuverability. In this embodiment, the rear wheels are also used to provide a steering correction for vehicle yaw stability on split coefficient surfaces. At step 108, the routine will determine if the vehicle is equipped with rear wheel steering, if such determination is necessary, and also if the rear steering is operating correctly. If the rear steer system is not available, for example because (1) the vehicle is not so equipped, (2) steer command authority is saturated due to other command functions, (3) the driver has switched off the feature, or (4) because of a diagnostically detected fault, the routine will proceed to step 110, in which the brakes are applied in the normal manner for split coefficient surfaces using brakes only. One example of such a normal manner is described in the previously identified U.S. Pat. No. 5,063,514, in which the ABS control is used to delay full application of the brakes so as to give the vehicle operator more time to sense a brake induced vehicle yaw moment and apply an operator input steering correction. This is realized, when brakes are applied in a split condition, by providing an initial slip threshold for the braked wheel on the high coefficient surface with a calibrated low value, e.g. +5 percent, which is then ramped up to a final slip value, e.g. +15 percent. An alternative known method is to control applied braking pressure to the brake of the wheel on the high coefficient surface so as to delay its increase through a stepped ramping process, wherein the rise and duration of the steps may be calibrated values. During the ramping process of this alternate method, normal ABS braking is modified consistently with the ramping. Either of these known methods will delay the application of full braking pressure on the high coefficient wheel. Similarly, in the case of brake apply in a traction control (acceleration) situation, the slip control method may be used with calibrated initial value and ramp rate, although in the traction control case the slip values are negative, e.g. an initial value of −5 percent ramping to −15 percent. In any case, from step 110, the routine returns for the next loop.

Returning to the flow chart, if a steering correction is found to be available at step 108 the routine proceeds to step 112, wherein it applies the brakes with steer calibration values. Since a steering correction will automatically be applied, there is less need to delay full application of braking pressure or force. Ideally, full braking would be immediately applied, but it is more likely, due to the finite bandwidth of the steering controller, that some delay will be required. Typically, the initial values might be the same as in the no steering correction case but the ramp rate to the full values will be significantly faster, with just enough delay to prevent full brake application until the steering correction is applied.

After completing step 112, the routine next determines and applies a feed-forward or open loop steering correction at step 114. The steering correction will be in a direction to oppose the yaw induced by the split coefficient surface brake apply. The steering correction may be applied to the rear wheels 16 and 18, the front wheels 12 and 14, or to all the wheels and comprises an additional steering angle added to whatever steering angle would ordinarily be applied. The direction of the steering correction will be as shown in the table of FIG. 3, wherein the first column indicates the steering control and wheels (front or rear) to which the steering correction is to be applied, the second column indicates the type of longitudinal velocity change (accel or decel) is being effected, the third column indicates which side of the vehicle left or right) has the high coefficient of friction and the fourth column indicates the desired direction of the steering correction. The magnitude of the steering correction may be a predetermined constant but is preferably derived from the longitudinal wheel slip difference between the two sides of the vehicle. The magnitude may also be determined from differences in calculated or measured tire forces on the two sides of the vehicle. For the four wheel steer vehicle of this embodiment with rear steer correction, the value may be given by the following equation:

$$\delta_r = \frac{[C_{\alpha f} + C_{\alpha r}]M_{zx}}{[a+b]C_{\alpha f}C_{\alpha r}[\mu_y + 1]}$$

wherein δr is the steering correction angle applied to the rear steer apparatus, $C_{\alpha f}$ and $C_{\alpha r}$ are the cornering stiffness of the front and rear tires, $M_{zx}$ is the yaw moment around the z (vertical) axis in the x (longitudinal) direction, a and b are the distances from the vehicle center of gravity to the front and rear axles, respectively, and $\mu_y$ is a factor (less than 1.0) indicating the reduction in applicable tire forces on the low coefficient surface. Typical values are $C_{\alpha f}$=50,000 N/rad, $C_{\alpha r}$=40,000 N/rad, a=1 m, b=1.5 m, $\mu_y$=0.1. The steering correction will be ramped out (step 104) when the split coefficient condition is no longer present to avoid sudden changes in brake apply.

After application of the open loop steering correction at step 114, the routine next determines if there is a yaw rate error. This may be accomplished in the same manner as it is in vehicle stability enhancement systems employing closed loop yaw rate controls: namely, comparing a measured yaw rate determined by a yaw rate sensor with a desired yaw rate calculated from steering angle and vehicle speed and/or comparing measured side slip to a desired side slip. In addition, the system may also determine if there is a side slip or side slip rate error. In a preferred embodiment, both a yaw rate error and a side slip or side slip rate error may be employed. Patents showing vehicle stability enhancement controls showing the derivation of yaw rate and side slip or side slip rate errors are, among others, U.S. Pat. No. 6,195,606, issued Feb. 27, 2001, U.S. Pat. No. 6,161,905, issued Dec. 19, 2000, U.S. Pat. No. 6,125,319, issued Sep. 26, 2000 and U.S. Pat. No. 6,035,251, issued Mar. 7, 2000. A closed loop steering correction is derived from the derived yaw rate, side slip and/or side slip rate errors and applied in addition to or in place of the open loop steering correction to reduce the derived error(s).

What is claimed is:

1. A control for a vehicle chassis having a plurality of wheels comprising at least a first wheel on a one side of the vehicle and second wheel on the opposite side of the vehicle, braking apparatus using at least one predetermined braking parameter for each of the plurality of wheels and steering apparatus for one or more of the plurality of wheels, the control comprising:

means for storing first and second calibrated values of the predetermined braking parameter;

means for detecting a split coefficient condition between the first and second wheels;

means for determining if a split coefficient steering correction is available; and means responsive to a detection of the split coefficient condition between the first and second wheels and a braking command signal for one of the first and second wheels having the higher coefficient of friction:

(a) if the split coefficient steering correction parameter may be used, actuating the braking apparatus for the one of the first and second wheels having the higher coefficient of friction with the first calibrated value of the predetermined braking parameter and simultaneously actuating the steering apparatus with the split coefficient steering correction to compensate for yaw induced by braking with the split coefficient condition; or alternatively (b) if the split coefficient steering correction parameter may not be used, actuating the braking apparatus for the one of the first and second wheels having the higher coefficient of friction with the second calibrated value of the predetermined braking parameter without simultaneously actuating the steering apparatus with the split coefficient steering correction.

2. The control of claim 1 further comprising:

means for measuring a vehicle yaw rate;

means for determining a desired yaw rate; and means for determining a yaw rate error from a difference between the measured vehicle yaw rate and the desired yaw rate, wherein the split coefficient steering correction comprises an open loop part derived from a steering correction parameter and a closed loop part derived from the yaw rate error.

3. The control of claim 2 wherein the means for detecting a split coefficient condition between the first and second wheels derives a difference in wheel slip between the first and second wheels and the open loop part of the split coefficient steering correction is derived from the difference in wheel slip between the first and second wheels.

4. The control of claim 1 further comprising:

means for measuring a vehicle side slip rate;

means for determining a desired side slip rate; and means for determining a side slip rate error from a difference between the measured vehicle side slip rate and the desired side slip rate, wherein the split coefficient steering correction comprises an open loop part derived from a steering correction parameter and a closed loop part derived from the yaw rate error.

5. The control of claim 4 wherein the means for detecting a split coefficient condition between the first and second wheels derives a difference in wheel slip between the first and second wheels and the open loop part of the split coefficient steering correction is derived from the difference in wheel slip between the first and second wheels.

6. The control of claim 1 wherein the means for detecting a split coefficient condition between the first and second wheels derives a difference in wheel slip between the first and second wheels and the split coefficient steering correction is derived at least partly from the difference in wheel slip between the first and second wheels.

7. A control for a vehicle chassis having a plurality of wheels comprising one or more wheels on a first side of the vehicle and one or more wheels on a second side of the vehicle, braking apparatus using at least one predetermined braking parameter for each of the plurality of wheels and steering apparatus for one or more of the plurality of wheels, the control comprising:

means for storing first and second calibrated values of the predetermined braking parameter;

means for detecting a split coefficient condition between the one or more wheels on a first side of the vehicle and one or more wheels on a second side of the vehicle;

means for determining if a split coefficient steering correction is available; and means responsive to a detection of the split coefficient condition and a braking command signal for one of the plurality of wheels on the side of the vehicle exhibiting the higher coefficient of friction:

(a) if the split coefficient steering correction parameter may be used, actuating the braking apparatus for the one of the first and second wheels having the higher coefficient of friction with the first calibrated value of the predetermined braking parameter and simultaneously actuating the steering apparatus with the split coefficient steering correction to compensate for yaw induced by braking with the split coefficient condition; or alternatively (b) if the split coefficient steering correction parameter may not be used, actuating the braking apparatus for the one of the first and second wheels having the higher coefficient of friction with the second calibrated value of the predetermined braking parameter without simultaneously actuating the steering apparatus with the split coefficient steering correction.

8. The control of claim 7 further comprising:

means for measuring a vehicle yaw rate;

means for determining a desired yaw rate; and means for determining a yaw rate error from a difference between the measured vehicle yaw rate and the desired yaw rate, wherein the split coefficient steering correction comprises an open loop part derived from a steering correction parameter and a closed loop part derived from the yaw rate error.

9. The control of claim 8 wherein the means for detecting a split coefficient condition derives a difference in wheel slip between one of the one or more wheels on the first side of the vehicle and one of the one or more wheels on the second side of the vehicle and the open loop part of the split coefficient steering correction is derived from the difference in wheel slip.

10. The control of claim 7 further comprising:
means for measuring a vehicle side slip rate;
means for determining a desired side slip rate; and
means for determining a side slip rate error from a difference between the measured vehicle side slip rate and the desired side slip rate, wherein the split coefficient steering correction comprises an open loop part derived from a steering correction parameter and a closed loop part derived from the yaw rate error.

11. The control of claim 10 wherein the means for detecting a split coefficient condition derives a difference in wheel slip between one of the one or more wheels on the first side of the vehicle and one of the one or more wheels on the second side of the vehicle and the open loop part of the split coefficient steering correction is derived from the difference in wheel slip.

12. The control of claim 7 wherein the means for detecting a split coefficient condition derives a difference in wheel slip between one of the one or more wheels on the first side of the vehicle and one of the one or more wheels on the second side of the vehicle and the open loop part of the split coefficient steering correction is derived from the difference in wheel slip.

* * * * *